United States Patent [19]

Takei et al.

[11] Patent Number: 4,758,844

[45] Date of Patent: Jul. 19, 1988

[54] PRINTING APPARATUS

[75] Inventors: Katsumori Takei; Hitoshi Fukushima; Kohei Iwamoto, all of Suwa, Japan

[73] Assignee: Seiko Epson Corporation, Tokyo, Japan

[21] Appl. No.: 69,681

[22] Filed: Jul. 6, 1987

Related U.S. Application Data

[63] Continuation-in-part of Ser. No. 841,925, Mar. 20, 1986.

[30] Foreign Application Priority Data

Jul. 4, 1986 [JP] Japan ................................ 61-157345

[51] Int. Cl.$^{4}$ ............................................ G01D 15/00

[52] U.S. Cl. .................................. 346/74.4; 346/74.2

[58] Field of Search .................... 346/74.2, 74.4, 74.5, 346/139 C, 105, 1.1, 76 PH, 76 R; 101/DIG. 5; 400/119, 120, 662; 219/216 PH

[56] References Cited

FOREIGN PATENT DOCUMENTS 0101081 11/1983 Japan .................................. 400/662

8201676 11/1983 Japan .................................. 400/120

*Primary Examiner*—Arthur G. Evans

*Attorney, Agent, or Firm*—Blum Kaplan

[57] ABSTRACT

A printing apparatus for printing on a transfer medium using an ink medium with a thermoplastic magnetic ink. A thermal head selectively heats and melts the magnetic ink. A magnetic head urges the melted magnetic ink from the ink medium to the transfer medium. Both the thermal head and the magnetic head are positioned on the same side of the transfer medium. The distance between the magnetic head and the platen can be adjusted depending upon the thickness of the transfer medium to maintain a constant speed of ink transfer from the ink medium to the transfer medium. Methods of printing by ejecting the ink from the ink medium onto the transfer paper and for adjusting the distance between the magnetic head and platen to adapt to varying thicknesses of transfer medium are presented.

28 Claims, 5 Drawing Sheets

FIG. 3
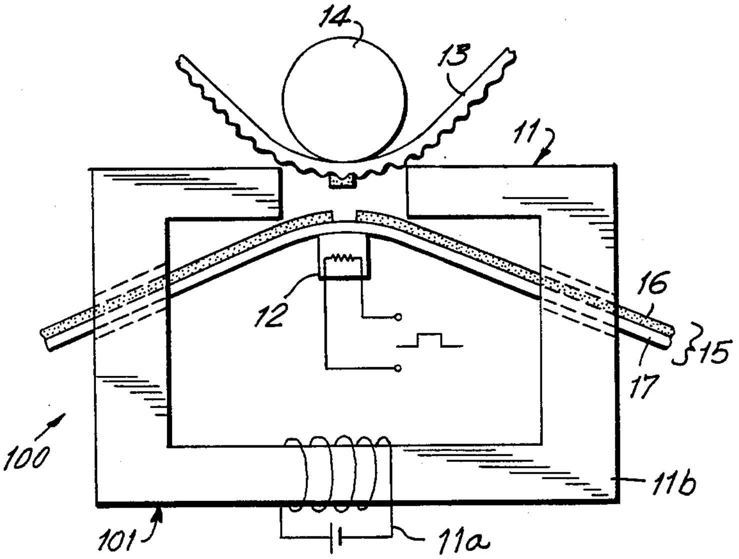
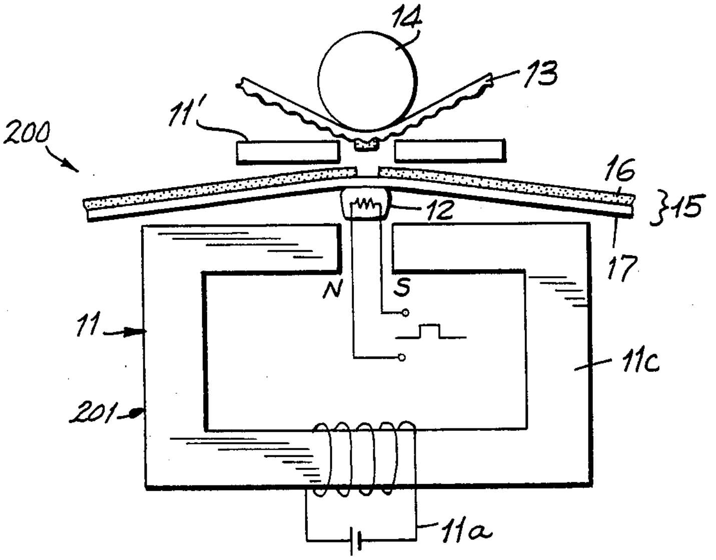
FIG. 4

PRINTING APPARATUS

This application is a continuation-in-part of application Ser. No. 841,925 filed on Mar. 20, 1986 entitled Imprinting Apparatus.

BACKGROUND OF THE INVENTION

The present invention is generally directed to a non-impact printing apparatus and in particular to a printing apparatus and method of forming characters or images on a transfer medium by transferring a thermoplastic magnetic ink from an ink medium to a transfer medium by application of heat and magnetic force to the ink.

Several compact and low cost non-impact printing methods utilizing magnetic ink have been proposed. Japanese Patent Application No. 52-96541 is directed to a printing apparatus in which magnetic inks are used for magneto-thermal transfer of the melted ink. A magnetic attraction forced produced by a magnet that is separate from the heat source acts on the ink to form desired thermal images. FIG. 1 discloses such a printer 50. The printer is arranged with a thermal head 51 proximate an ink medium 52 including a base film 53 and thermoplastic magnetic ink 54. A transfer medium 55 for selectively receiving the ink is placed proximate to ink medium 52 and a magnet 56. Thermal head 51 and magnet 56 are on opposite sides of transfer medium 55.

When thermal energy is applied to base film 53 by thermal head 51 the thermoplastic magnetic ink 54 is liquified so that the melted ink medium can be pulled off of base film 53 and onto transfer paper 55. Various ways are known for increasing the rate at which the ink which is to be deposited on the paper, is melted and for increasing the rate at which the melted ink is transferred to the paper. These approaches are used so that high quality characters and images can be printed on any type of transfer paper including those having great surface roughness.

However, the known printers include the transfer medium sandwiched between the thermal head and the magnet. In addition, they have separate thermal application and magnetic attraction force mechanisms. This known structure causes two distinct problems with the prior art printing approaches. First, the thickness of the transfer medium is severely restricted to a narrow range of hickness. The thicker the transfer medium is the further the magnetic head, which generates the magnetic attraction force, is spaced apart from the magnetic ink. As a result, the magnitude of the magnetic attraction force is reduced, which reduces the efficiency of transferring the magnetic ink. Second, when the printer in accordance with the prior art approach is adapted for use as a serial printer the magnetic and thermal heads must be maintained with accurate spacing relative to each other and to the ink medium and transfer medium. Thus, the magnetic head and the thermal head must move in a synchronized manner. Complicated constructions are thus required to insure that the magnetic and thermal heads are accurately positioned and the cost of such a printer significantly increases. The hard cost, or cost of components used in such a printer is thus increased.

Accordingly, there is a need for an improved non-impact printer and printing method utilizing thermoplastic magnetic ink on a base film which prints high quality characters and images on transfer papers of varying degrees of roughness and thickness while simplifying the mechanical structure and reducing the cost of the printer.

SUMMARY OF THE INVENTION

The invention is generally directed to a printing apparatus for printing on a transfer medium using thermoplastic magnetic ink. The printer includes a thermal application mechanism for selectively applying thermal energy to melt the thermoplastic magnetic ink and a magnetic force for applying a magnetic force to transfer the ink to the transfer medium. Both the thermal application mechanism and the magnetic force generator are located on one side of the transfer medium.

Accordingly, it is an object of the invention to provide an improved printer.

Another object of the invention is to provide an improved printer which prints with thermoplastic magnetic ink.

A further object of the invention is to provide an improved non-impact printer utilizing thermoplastic magnetic ink which prints high quality characters and images on transfer medium with a high degree of surface roughness and varying thicknesses.

Yet another object is to provide an improved non-impact printer utilizing thermoplastic magnetic ink capable of use as a serial printer which reduces the hard costs of manufacturing the printer.

Yet a further object of the invention is to provide an improved method for printing utilizing a non-impact printer and thermoplastic magnetic ink.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

FIG. 3 is a schematic view of a printer constructed in accordance with a first embodiment of the invention;

FIG. 4 is a schematic view of a printer constructed in accordance with a second embodiment of the invention;

DETAILED DESCRIPTION OF THE PREFERRED EMBODIMENTS

Figure 1:
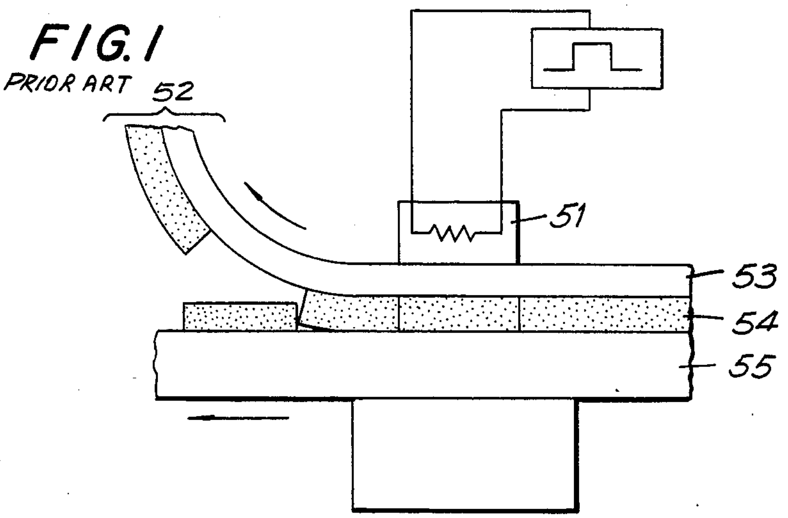
FIG. 1 PRIOR ART
FIG. 1 is a schematic view of a printer using thermoplastic magnetic ink constructed in accordance with the prior art.
Figure 2A:
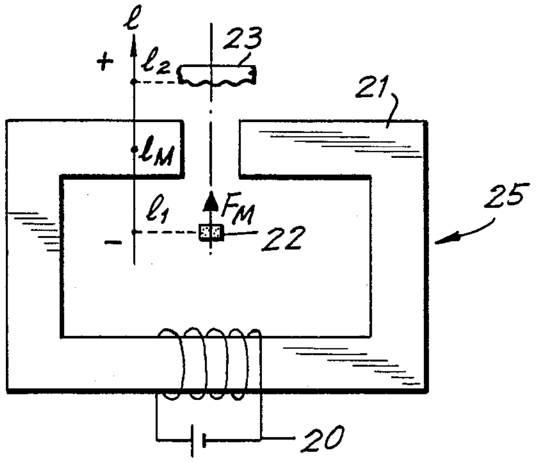
FIGS. 2A and 2B are schematic and graphical representations, respectively of the printing apparatus and printing method in accordance with the invention.
Figure 2B:
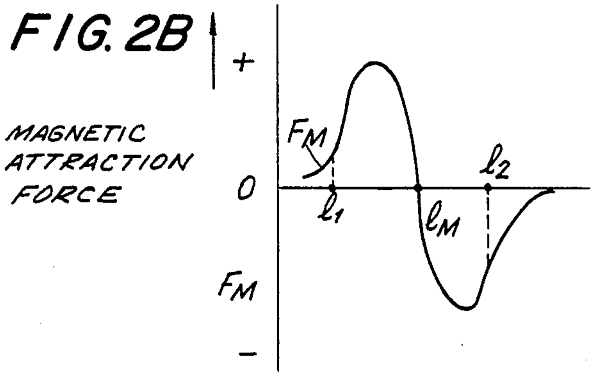

Reference is first made to FIG. 2A wherein a generalized form of a printing apparatus in accordance with the invention is depicted. An electrically energized coil 20 and a magnetic or ferromagnetic head member 21 form a portion of a magnetic circuit 25. Magnetic circuit 25 creates a magnetic force $F_M$ which acts on magnetic ink 22 which is disposed within the magnetic field. As a result, the magnetic force $F_M$ on the magnetic ink 22 varies depending upon the location of ink 22 relative to the magnetic circuit as shown in FIG. 2B.

When magnetic ink 22 is located at a position $l_1$ and the transfer medium 23 is located at a position $l_2$ and the magnetic ink 22 is moved in the positive direction (i.e. from the "−" to the "+" in FIG. 2A), the work (energy) $W_1$ imparted to ink 22 as it moves from position $l_1$ to position $l_M$ is represented by $W_1$ $$W_1 = \int_{l_1}^{l_M} F_M \cdot dl.$$

The work (energy) $W_2$ imparted to the ink as it moves from position $l_M$ to position $l_2$ is represented by $$W_2 = \int_{l_M}^{l_2} F_M \cdot dl.$$

Thus, where $W_1+W_2>0$, ink 22 is transferred to transfer medium 23. Setting up a physical situation in which $W_1+W_2>0$ is easily achieved by appropriate selection of positions $l_1$ and $l_2$. As can be seen in FIG. 2B, the area under the $F_M$ curve from $l_1$ to $l_M$ must be greater than the negative area above the curve from $l_M$ to $l_2$.

Reference is next made to FIGS. 3 and 4 wherein two embodiments of printers constructed in accordance with the invention are depicted, like elements represented by like reference numerals. The magnetic circuit is created by magnetic forces generated by magnetic head 11 and the thermal energy is produced by thermal head 12. The transfer medium 13 is supported around a platen roller 14. A magnetic ink medium 15 includes a magnetic ink layer 16 formed on a supporting layer 17. In the embodiment of FIG. 4 a supplemental magnetic pole 11′ in addition to magnetic head 11 is integrally formed with magnetic head 11.

In the printer 100 of FIG. 3 thermal head 12 and magnetic head 11 are formed as a single print head unit 101 on one side of the transfer medium 13. Transfer medium 13 can be, e.g. paper of various types. Platen roller 14 is on the opposite side of transfer medium 14 than thermal head 12 and magnetic head 11. Transfer medium 13 is either slidable relative to platen roller 14 or is moved by rotation of platen roller 14. When a print signal generator (a conventional element which is not shown) generates a print command, the partially magnetic ink layer 16 on magnetic ink medium 15 is melted by the thermal energy generated by thermal head 12. Thermal head 12 only melts the portions of the ink layer which are to be printed. The melted ink layer 16 is then transferred to transfer medium 13 by the application of a transfer force generated by magnetic head 11. The transfer force removes the selected melted portion of magnetic ink layer 16 from supporting layer 17 of magnetic ink medium 15 and deposits the ink on transfer medium 13.

Supporting layer 17 on magnetic ink medium 15 can be formed of polyethylene terephthalate (PET), polyester or similar materials. Magnetic ink layer 16 consists of a thermoplastic resin such as a paraffin wax and a strongly magnetic material such as $Fe_2O_3$ and $FeO \cdot Fe_2O_3$. The color of the transferred dots is determined by the color of the strongly magnetic powder or by a dye or pigment which is added to the magnetic ink layer.

The printer 200 shown in FIG. 4 has the magnetic head 11, secondary magnet 11′ and thermal head 12 formed as a single print head unit 201. In operation, thermal energy is applied to magnetic ink medium 15 by thermal head 12. Thermal head 12 and magnetic head 11 are positioned on the same side of magnetic ink medium 15. As with printer 100 of FIG. 3, the magnetic ink layer 16 is melted by thermal head 12. A magnetic force, generated by magnetic head 11 either as a permanent magnet or with current through coil 11*a*, causes the transfer of magnetic ink 16 to transfer medium 13. Supplemental magnet 11′ is provided to stabilize the direction of the magnetic force of magnetic head 11, to urge the ink toward transfer medium 13 and to more accurately position the magnetic ink 16 on transfer medium 13. The positioning of thermal head 12 on the same side of transfer medium 13 as magnetic head 11 allows for magnetic head 11, supplemental magnet 11′ and thermal head 12 to be formed as a single unit.

The yoke 11*b* and supplemental magnetic 11′ of magnetic head 11 can be formed of materials having a high permeability such as Fe, Fe-Si, Fe-Ni, Fe-Co, Mn-Zn ferrite, and Ni-Zn ferrite, for example. In addition to being formed as an electromagnet with a powered coil, magnetic head 11 can be formed as a permanent magnet having a strong magnetic force.

In a first embodiment printing is formed by utilizing a printer of the type shown in FIG. 3. In particular, the print head of printer 100 includes magnetic head 11 and thermal head 12 formed as a single unit which moves perpendicular to the transfer medium and parallel to the length of platen 14 (i.e. along a printing line). Thermal head 12 melts the magnetic ink layer 16 on magnetic ink medium 15 only at the dots which are to be printed (selected by the print generator). These melted dots of thermoplastic magnetic ink are then moved to transfer medium 13 by the magnetic force of magnetic head 11, which completes the printing operation.

In a preferred embodiment the yoke of magnetic head 11 is formed of permenjur (an alloy of Fe 50 wt. % and Co 50 wt. %). This alloy creates a magnetic force NI=1,000 (AT). The thermal head may be a thin film type head having a resolution of about 240 DPI (dots per inch). The energy applied to the thermal head is about 0.4 mJ/dot. The magnetic ink medium 15 is formed of a PET (polyethylene terephthalate) film having a thickness of about 4 μm and a magnetic ink layer having a thickness of about 6 μm laminated on the PET film. The composition of the magnetic ink is:

| | |
|---|---|
| magnetite (diameter = 0.2 μm) ($FeO.Fe_2O_3$) | 35 wt % |
| paraffin wax | 40 wt % |
| wax oxide | 15 wt % |
| EVA (Ethylene Vinyl Acetate) | 5 wt % |
| dye | 3 wt % |
| dispersing agent | 2 wt % |

(wt. % indicates the relative ratio of a particular component by weight to the total quantity of a magnetic ink). A magnetic ink layer 16 formed of the above noted ink composition can be efficiently and precisely transferred to transfer medium 13 to achieve high quality printing.

The transfer speed, or time for the magnetic ink to move from magnetic ink medium 15 to transfer medium 13 can be made uniform by varying the distance between platen 14 and magnetic head 11 depending upon the thickness of transfer medium 13. A mechanism for adjusting the distance between platen 14 and magnetic head 11 is shown schematically in FIG. 5 as head platen adjustment mechanism 35, which moves one or both of head 201 and platen 14 in a conventional manner. For example, if transfer medium 13 is thick, platen 14 and magnetic head 11 must be separated by a relatively large distance. On the other hand, if transfer medium 13 is relatively thin, platen 14 and magnetic head 11 must be placed only a relatively small distance apart. As a result, with a printer of the type shown in FIG. 3 it is relatively simple to manufacture a print head which includes magnetic head 11 and thermal head 12 as a single unit and to then locate platen 14 the desired distance from the print head.

Printing is performed by printer 200 shown in FIG. 4 in a manner similar to that of printer 100 shown in FIG. 3. The print head in printer 200 includes magnetic head 11 with a yoke 11*c*, thermal head 12 and supplemental magnet 11' formed as a single unit which is adapted to move perpendicular to transfer medium 13 along the length of platen roller 14 (side to side on a paper or other transfer medium), as in the embodiment of FIG. 3. The thermal head 12 in the embodiment of FIG. 4 likewise may be a generally thin film head having a resolution of 240 DPI with an energy of about 0.4 mJ/dot applied to the thermal head as in the embodiment of FIG. 3. The construction of magnetic ink medium 15 and the composition of magnetic ink 16 are the same as those described above with regard to the embodiment of FIG. 3.

Figure 5A:
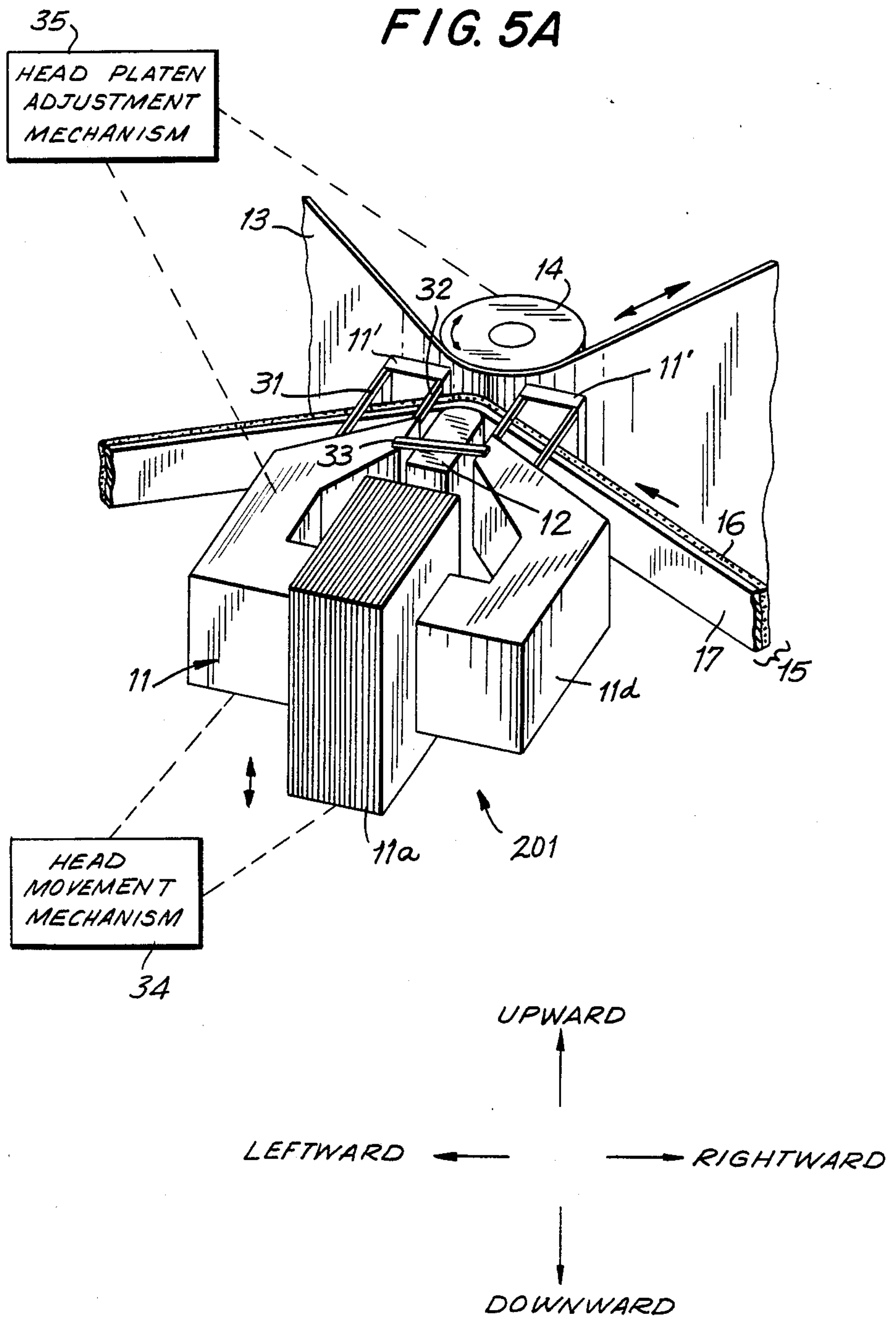
FIG. 5A is a perspective view of a printer constructed in accordance with the second embodiment of the invention.
Figure 5B:
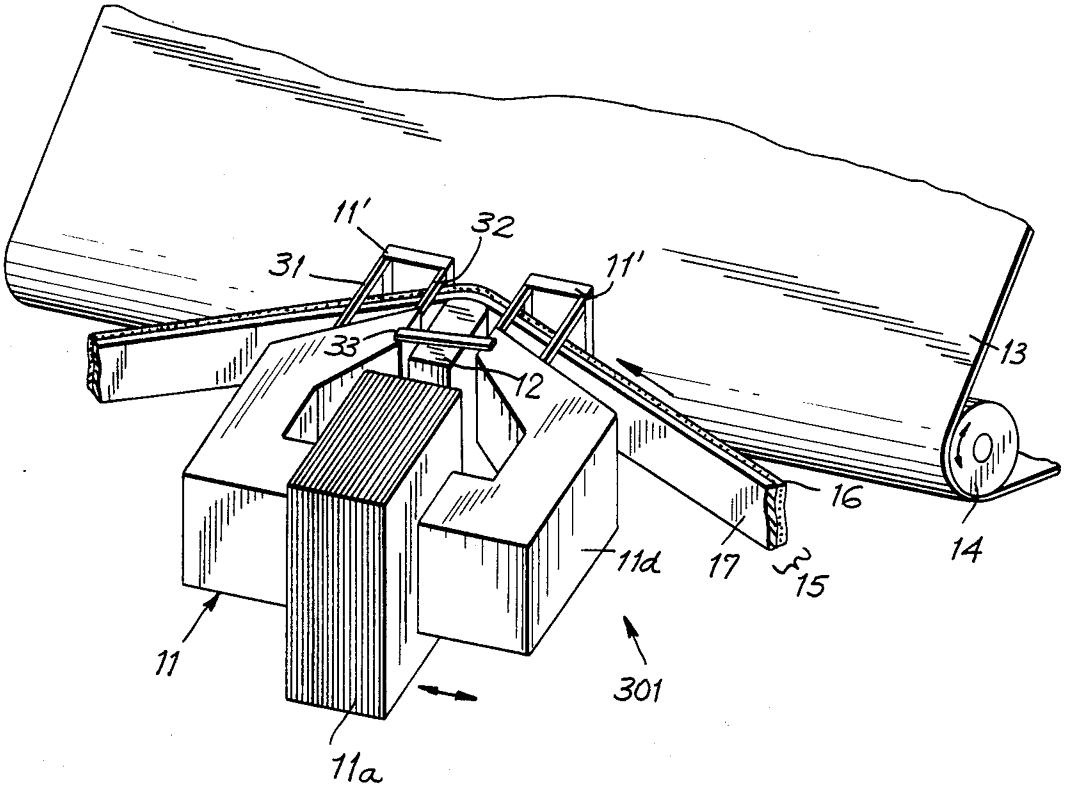
FIG. 5B is a perspective view of a printer also constructed in accordance with the second embodiment of the invention.

Reference is next made to FIGS. 5A and 5B wherein detailed views of print heads 201 and 301 constructed in accordance with the second embodiment of the invention are depicted. Transfer medium 13 is in contact with platen roller 14 and moves with the rotation of platen roller 14. Print heads 201 and 301 include magnetic head 11 and thermal head 12 which are formed as a single unit. Thermal head 12 has a thermal generator at its contact points with magnetic ink medium 15. A printing command heats thermal head 12 corresponding to the dots selected for printing. A magnetic coil 11*a* is wound around yoke 11*d* of magnetic head 11 inducing a magnetic field which causes the melted portions of magnetic ink layer 16 to be transferred onto transfer medium 13. Supplemental magnetic pole 11' and thermal head 12 are secured to magnetic head 11 by mechanical connectors such as screws or adhesive material. As shown in FIGS. 5A and 5B, supplemental magnetic pole 11' is attached to magnetic head 11 by posts 31, 32. Thermal head 12 is attached to magnetic head 11 by support bar 33.

Reference is made to FIG. 5A for the manner in which print head 201 prints. Platen 14 moves transfer medium 13 from side to side relative to print head 201. The paper moves either leftward or rightward relative to print head 201 depending upon the direction of rotation of platen 14 (FIG. 5A). Print head 201 is moved along the length of platen 14, i.e. upward or downward. Ink medium 15 moves synchronously with print head 201.

To print the heating element of thermal head 12 is located at the desired position on the transfer medium which is established as a print starting position. Position Ⓐ in FIG. 5A is indicated as the print starting position. The heat element of thermal head 12 is formed to print one vertical row of dots. Then, platen 14 advances transfer medium 13 printing along the way, until the end of the first row, identified as position Ⓑ in FIG. 5A, opposes thermal head 12. This completes a first line of printing. Then, print head 201 and ink medium 15 are moved along the axis of platen 14 (downward in FIG. 5A, the legend in FIG. 5A being for ease of discussion purposes and not limiting the invention to a particular orientation of the various components). The print head is advanced so that thermal head 12 opposes position Ⓒ and printing of the next line continues by movement of platen 14 until thermal head 12 opposes position Ⓓ. During printing in both directions ink medium 15 advances in only one direction so that a fresh portion of the ink medium is always present between thermal head 12 and transfer medium 13 at each printing position. In FIG. 5A ink medium 16 moves leftward regardless of the direction in which transfer medium 13 is moving relative to print head 201.

Bidirectional printing is enabled by the absence of contact between the transfer medium and the ink medium. This allows the transfer medium to move from position Ⓐ to position Ⓑ on a first line of printing and to move from position Ⓒ to position Ⓓ on a second line of printing while ink medium 16 moves in a single direction at all times regardless of the printing direction.

In addition, when ink medium 15 is moved at a low speed without changing the period of the print signal or the speed of movement of transfer medium 13, the ink medium consumption is limited, making it possible to conserve the ink medium (ribbon).

As shown in FIG. 5B, the line type thermal head of print head 201 may be used for standard serial type printing utilizing the print head 301. Print head 301 is identical to print head 201 except for its orientation relative to transfer medium 13 and platen 14. Thermal head 12, which is a line type thermal head is positioned perpendicular to the longitudinal axis of platen 14. Magnetic ink medium 15 has substantially the same height as thermal head 12 (or may have substantially the same height as that of transfer medium 13). The direction of movement of ink medium 15 is substantially parallel to the longitudinal axis of platen 14.

Printing is performed in accordance with the standard serial printer operation in which magnetic head 301 is moved laterally along the paper (i.e. along the axis of platen 14), by a print head movement mechanism, schematically indicated as 34. After a line of printing is completed platen 14 is rotated to feed the next line of transfer medium 13 in position and printing can commence either bidirectionally or unidirectionally. Where the thermal head has a heat generator with 24 dots in the vertical direction printing of one line means to print 24 dots vertically across the transfer medium.

The printing density can be increased. In a print head where up to 24 dots are printed at each printing position by the thermal head during one pass or line, the printing density can be doubled by feeding transfer medium 13 by one half of a dot. Then, the print head makes a second pass, either in the opposite direction or in the same direction as the first pass thereby providing the capability to print between each of the dot positions of the thermal head. This effectively doubles the print density of the thermal head.

Figure 6A:
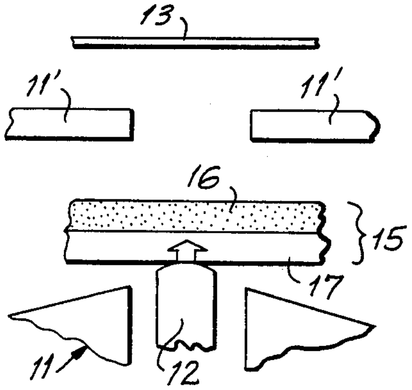
FIGS. 6A, 6B, 6C and 6D are enlarged top plan views showing the manner in which the thermoplastic magnetic ink is transferred to the transfer medium in accordance with the invention.
Figure 6B:
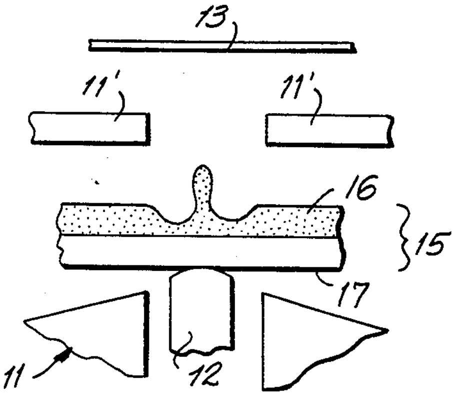
Figure 6C:
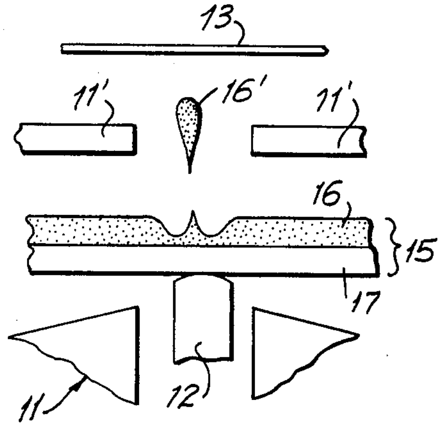
Figure 6D:
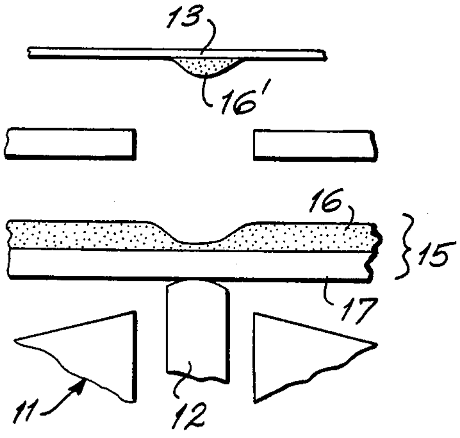

Reference is next made to FIGS. 6A–6D wherein a method of printing utilizing the printer of FIG. 4 is depicted. As shown in FIG. 6A, thermal head 12 is energized in the appropriate locations to melt magnetic ink layer 16 of magnetic ink medium 15 in accordance with the dot information to be printed. Then, as shown in FIGS. 6B and 6C the magnetic force generated by magnetic head 11 and stabilized by supplemental magnet 11', which assures that the ink drop 16' moves straight to transfer medium 13, draws the dot of ink off backing layer 17 and toward transfer medium 13. Finally, ink drop 16' contacts and rests against transfer medium 13 as shown in FIG. 6D. As also seen in FIG. 6D the magnetic ink layer 16 has been substantially torn off backing layer 17 at the location of the printed dot. In this way, high quality printing utilizing the printing apparatus of FIG. 4 is achieved.

In the printers shown in FIGS. 3 and 4 magnetic ink medium 15 may be brought directly into contact with transfer medium 13 when printing is being performed instead of the non-contact condition shown in FIGS. 3 and 4.

Accordingly, a high quality printer with a simple construction is provided in which a mechanism for applying thermal energy and a mechanism for generating magnetic forces used in printing with thermoplastic magnetic ink are provided on one side of the transfer medium. This structure makes it possible to produce a simply constructed and smoothly operating printer with the thermal energy source and magnetic attraction force systems secured to each other to simplify their relative positioning. In addition, the fixed spatial arrangement of the thermal energy and magnetic force sources on the same side of the transfer medium allows the magnetic force, which is used to eject the magnetic ink, to be set at a fixed value regardless of the thickness of the transfer medium. This makes it possible to print on postcards, notebooks and similar transfer medium with very poor surface smoothness. Thus, a printer capable of high quality printing regardless of the transfer medium's surface roughness is achieved.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A printing apparatus for printing on a transfer medium using an ink medium with a thermoplastic magnetic ink, comprising:
   - thermal head means for selectively heating and melting the magnetic ink positioned on a first side of the transfer medium; and
   - magnetic head means for urging the melted magnetic ink from the ink medium to the transfer medium positioned on the first side of the transfer medium.

2. The printing apparatus of claim 1 wherein the magnetic head means is mechanically coupled to the thermal head means.

3. The printing apparatus of claim 2 wherein the magnetic head means and the thermal head means are formed as one unit.

4. The printing apparatus of claim 2 wherein the magnetic head means and thermal head means move as a unit relative to the transfer medium.

5. The printing apparatus of claim 1 further comprising a platen for supporting the transfer medium on the opposite side of the transfer medium from the thermal head means and magnetic head means.

6. The printing apparatus of claim 1 wherein the magnetic head means further includes a supplemental magnet between the magnetic head means and transfer medium for accurately positioning the magnetic ink on the transfer medium.

7. The printing apparatus of claim 6 wherein the supplemental magnet includes a gap through which ink is transferred to the transfer medium.

8. The printing apparatus of claim 5 wherein the distance between the magnetic head means and the platen is adjusted depending upon the thickness of the transfer medium to maintain a constant speed of ink transfer from the ink medium to the transfer medium.

9. The printing apparatus of claim 6 wherein the thermal head means, magnetic head means and supplemental magnet are mechanically connected.

10. The printing apparatus of claim 1 further comprising means for moving the thermal head means and magnetic head means relative to the transfer medium.

11. The printing apparatus of claim 1 wherein the magnetic head means includes a permanent magnet.

12. The printing apparatus of claim 1 wherein the magnetic head means includes an electromagnet and a coil.

13. The printing apparatus of claim 1 wherein the magnetic head means includes a yoke formed of permenjur.

14. The printing apparatus of claim 1 wherein the magnetic head includes a yoke formed of one of the group including Fe, Fe-Si, Fe-Ni, Fe-Co, Mn-Zn ferrite, and Ni-Zn ferrite.

15. The printing apparatus of claim 1 wherein the thermal head means contacts the ink medium.

16. The printing apparatus of claim 1 wherein the magnetic head means includes a yoke having a gap, the gap connecting an inner surface of the yoke and an outer surface of the yoke.

17. The printing apparatus of claim 16 wherein the thermal head means is positioned proximate the gap.

18. The printing apparatus of claim 17 wherein the thermal head means extends outside the gap.

19. The printing apparatus of claim 17 wherein the thermal head means is positioned within the inner surface of the yoke.

20. The printing apparatus of claim 18 further including a supplemental magnet coupled to the magnetic head means and positioned so that the thermal head means is between the supplemental magnet and the magnetic head means.

21. The printing apparatus of claim 20 wherein the supplemental magnet has a supplemental gap which is substantially aligned with the gap in the yoke.

22. The printing apparatus of claim 20 wherein the supplemental magnet is mechanically coupled to the yoke.

23. The printing apparatus of claim 1 wherein the thermal head means includes a thin film thermal head.

24. A method of printing on a transfer medium using an ink medium with a thermoplastic magnetic ink, comprising:

adjusting the distance between a magnetic head and a platen based on the thickness of the transfer medium;

melting selected portions of the thermoplastic ink with a thermal head; and transferring the selected portions of the thermoplastic ink to the transfer medium by applying a magnetic force produced by the magnetic head.

25. The method of claim 20 further comprising directing the transfer of ink from the ink medium to the transfer medium with a supplemental magnet between the transfer medium and the magnetic head.

26. A method of printing on a transfer medium using an ink medium with a thermoplastic magnetic ink, comprising:

melting selected portions of the thermoplastic magnetic ink on the ink medium; and ejecting melted thermoplastic magnetic ink from the ink medium to the transfer medium.

27. The method of claim 26 wherein the melted ink is ejected by applying a magnetic force to the melted ink which forces the ink off the ink medium and onto the transfer medium.

28. The method of claim 27 further including directing the flow of ejected ink with a supplemental magnet positioned between the ink medium and the transfer medium.

* * * * *